US012148098B1

(12) United States Patent
Regan (10) Patent No.: US 12,148,098 B1
(45) Date of Patent: Nov. 19, 2024

(54) SYSTEMS AND METHODS FOR AUTOMATICALLY DEFINING AND ACCURATELY ADJUSTING NORMALS FOR PRIMITIVES OF A THREE-DIMENSIONAL MODEL

(71) Applicant: Illuscio, Inc., Culver City, CA (US)

(72) Inventor: Mitchell Regan, Olathe, KS (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/625,462

(22) Filed: Apr. 3, 2024

(51) Int. Cl.
*G06T 17/20* (2006.01)

(52) U.S. Cl.
CPC .................... *G06T 17/20* (2013.01)

(58) Field of Classification Search
CPC .................. G06T 17/20; G06T 15/20
See application file for complete search history.

(56) References Cited

U.S. PATENT DOCUMENTS

| | | | |
|---|---|---|---|
| 2009/0009513 A1* | 1/2009 | van den Hengel | G06T 7/579 345/420 |
| 2014/0245231 A1* | 8/2014 | Cha | G06T 17/10 715/848 |
| 2015/0042651 A1* | 2/2015 | Dwyer | G06T 15/50 345/426 |

* cited by examiner

*Primary Examiner* — Michelle Chin
(74) *Attorney, Agent, or Firm* — Ansari Katiraei LLP; Arman Katiraei; Sadiq Ansari (57) ABSTRACT

A three-dimensional (3D) graphics system automatically defines or accurately adjusts normals for primitives of a 3D model. The system receives the 3D model primitives, selects a particular primitive at a specific position relative to other primitives of the 3D model, and defines a normal with a first direction for the particular primitive based on an association of the normal with the first direction to the specific position. The system then selects a set of primitives with positions next to the particular primitives, and defines a normal for each primitive of the set of primitives with a second direction that is perpendicular to a surface spanned between positions of the particular primitive and each primitive of the set of primitives.

18 Claims, 7 Drawing Sheets

SYSTEMS AND METHODS FOR AUTOMATICALLY DEFINING AND ACCURATELY ADJUSTING NORMALS FOR PRIMITIVES OF A THREE-DIMENSIONAL MODEL

BACKGROUND

Three-dimensional (3D) models are defined with a set of primitives. Each primitive is defined with a position in a 3D space and visual characteristics for visualizing the primitive at the defined position. For instance, a primitive may be defined with x, y, and z coordinate values (e.g., the positional data) and red, green, and blue color values (e.g., the visual characteristics). The primitives may include polygons or meshes that are connected to another in order to form a 3D mesh model of a represented object or scene. The primitives may also include discrete and/or disconnected points of a point cloud that collectively form the 3D shape of the represented object or scene. Other 3D models may be defined with other types of primitives.

Although the positional data and the visual characteristics are sufficient to render the 3D model. Additional primitive data that is not included as part of the positional data and the visual characteristics may improve the rendering efficiency and/or accuracy.

Normals are one example of additional primitive data that is often absent from the primitive definition and/or incorrectly defined. Normals define the angle, direction, or orientation that the primitives face or are exposed to. The normal for a particular primitive may be represented as a line, ray, or vector that is perpendicular to the surface, feature, or article represented by that particular primitive.

The direction of each normal relative to a render position or position and orientation of a virtual camera may be used to efficiently determine which primitives are visible and should be rendered and which primitives are directed away from the render position and should not be rendered. In other words, the normals may be used for occlusion culling.

Normals also provide critical data for accurately or realistically lighting the 3D model. The normals may be used with ray-tracing or other lighting techniques to determine the angle or direction by which light from a light source reflects off the primitives. Accordingly, there is a need to automatically and accurately define normals for primitives of a 3D model in order to improve rendering efficiency and 3D realism.

DETAILED DESCRIPTION OF PREFERRED EMBODIMENTS

The following detailed description refers to the accompanying drawings. The same reference numbers in different drawings may identify the same or similar elements.

Disclosed are systems and associated methods for automatically defining and accurately adjusting normals for primitives of a three-dimensional (3D) model. The systems and methods may generate and add the normals to each primitive of the 3D model when the 3D model and/or primitives are defined without the normal data. The systems and methods may also adjust normals that have already been defined for the 3D model primitives to correct the angle or direction of the normals. For instance, the primitives may be manually created by an artist, may be generated by a scanner when obtaining positional data from scanning a physical object, or may be inherited from one or more basic shapes from which the complex shape of the 3D model is created. The pre-existing normals may be defined with an incorrect or inaccurate angle, direction, or orientation due to imprecision associated with each normal generation technique. The systems and methods may calculate the correct angle, direction, or orientation for the normals, and may adjust the normal definitions accordingly.

The normals (e.g., the normal data including the angle, direction, and/or vector of each normal) may be stored as part of each primitive. For instance, a vector specifying the direction of a normal may be added to the definition of a primitive such that the primitive definition includes a 3D position (e.g., x, y, and z positional coordinates), visual characteristics (e.g., color values), and the normal data for that primitive.

A rendering system may reference the normal data associated with the 3D model primitives to select a subset of the primitives to render. Specifically, the rendering system may compare the normal direction or angle of each primitive to the direction or orientation of a virtual camera, render position, or field-of-view (e.g., render frustum), and may select the subset of the primitives that are visible and should be rendered and to unselect other primitives that are in the field-of-view but are not visible or are directed away from the virtual camera or render position.

The rendering system may also reference the normal data when lighting the 3D model. The rendering system uses the normal data to determine the direction and manner by which light from a virtual light source reflects off the primitives, and changes the shading, lighting, and/or colors of the 3D model based on the light reflectivity.

Figure 1:
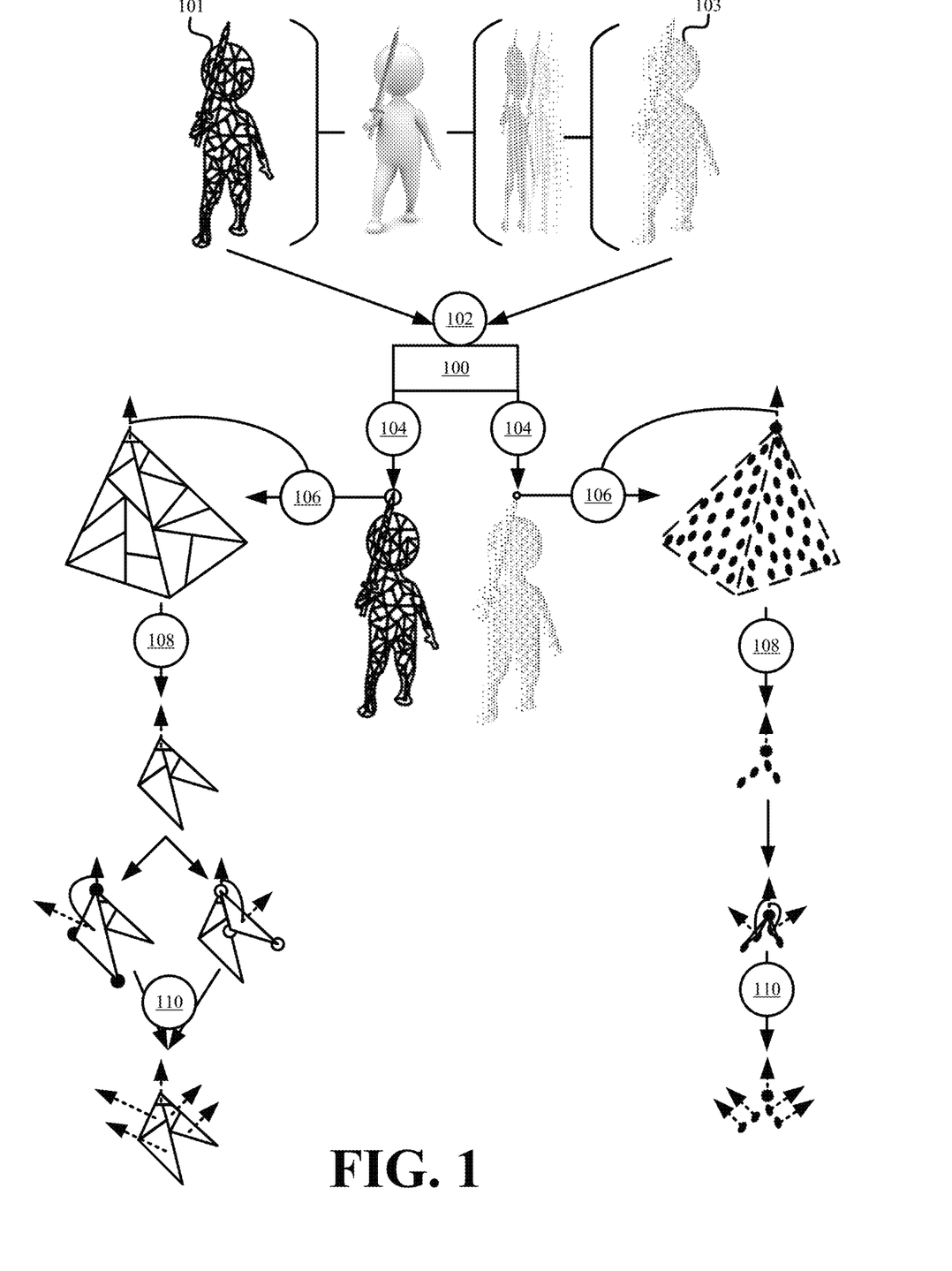
FIG. 1 illustrates an example of automatically defining normals for primitives of a three-dimensional (3D) model in accordance with some embodiments presented herein.

FIG. 1 illustrates an example of automatically defining normals for primitives of a 3D model in accordance with some embodiments presented herein. 3D graphics system 100 receives (at 102) a 3D model that is defined with a set of primitives that have no normal data. In some embodiments, the 3D model may include mesh model 101 that generates a 3D form with a connected set of polygons or meshes. In some other embodiments, the 3D model may include point cloud 103 that generates the 3D form with a distributed set of points. Each primitive (e.g., polygon, point, etc.) may be defined with positional data (e.g., x, y, and z coordinates) and with visual characteristics (e.g., color, transparency, albedo, chrominance, luminance, specular, diffuse, and/or other values). However, the primitives may be defined without normal data specifying the angle or direction that the primitive faces or is directed toward.

The 3D model may be created or defined without normal data. For instance, photogrammetry techniques may define the positions and visual characteristics of the primitives from two-dimensional (2D) images of an object or scene, but are unable to determine or define the directions for the normals based on the 2D image data.

3D graphics system 100 scans the primitive positions to select (at 104) a reference primitive at a position that is commonly associated with a particular normal direction. For instance, the topmost primitive (e.g., primitive with the largest y-coordinate value) in the 3D model may have a high probability (e.g., 90% or greater) that it is associated with an upward directed normal.

3D graphics system 100 defines (at 106) a normal with the particular normal direction for the reference primitive. For instance, 3D graphics system 100 defines (at 106) the upward directed normal for the topmost primitive of the 3D model.

3D graphics system 100 selects (at 108) the primitives that are the nearest neighbors or that are in proximity to the reference primitive. For instance, 3D graphics system 100 performs a nearest neighbor search or searches outward from the position of the reference primitive to identify the primitives that are positioned the least distance from the reference primitive.

3D graphics system 100 defines (at 110) the normals for the nearest neighbors or proximate primitives based on an offset or difference in the position between the nearest neighbors or proximate primitives and the reference primitive. In some embodiments, 3D graphics system 100 determines the angle of a surface that spans between the reference primitive and the nearest neighbors or proximate primitives, and defines (at 110) the normals according to the determined surface angle and the direction of the normal of the reference primitive. For points of a point cloud, the surface may be generated with vertices corresponding to the positions of the reference primitive and the nearest neighbor primitives. For meshes of a 3D mesh model, the surface may be generated with vertices corresponding to the outermost or furthest vertices of the reference primitive and the nearest neighbor primitives.

3D graphics system 100 continues defining normals for the remaining primitives by changing the reference primitive to be one or more of the nearest neighbor primitives or proximate primitives with a defined (at 110) normal, selecting the primitives that are the nearest neighbors or proximate to the new reference primitives and that do not have a defined normal, and defining the normals for the newly selected primitives based on the angle of the surface that spans between the newly selected reference primitive and the newly selected nearest neighbors or proximate primitives of the newly selected reference primitive. 3D graphics system 100 continues in this manner until the primitives of the 3D model are defined with a normal.

Figure 2:
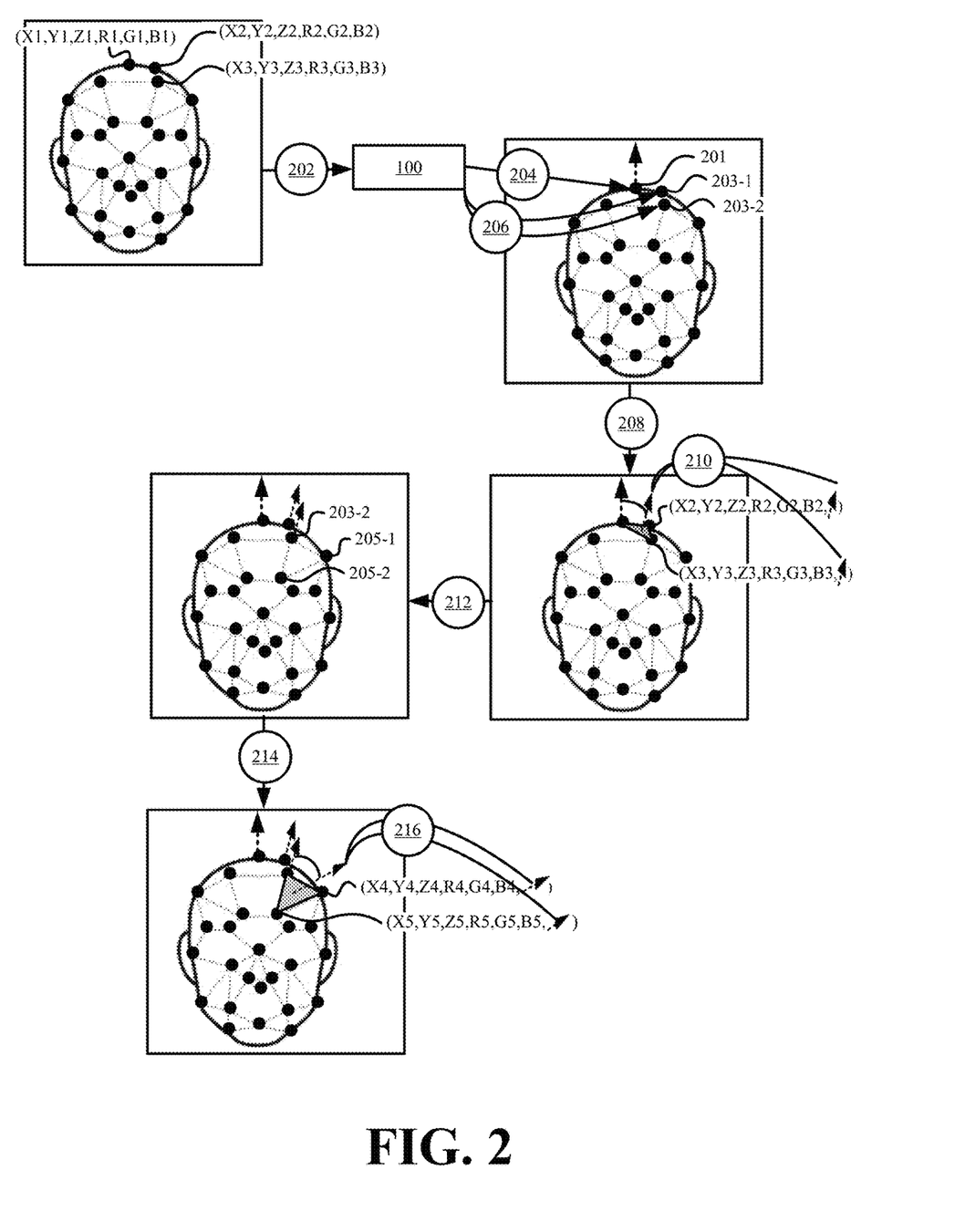
FIG. 2 illustrates an example for progressively defining the normals that are perpendicular to the face of an expanded surface or polygon between selected primitives in accordance with some embodiments presented herein.

FIG. 2 illustrates an example for progressively defining the normals that are perpendicular to the face of an expanded surface or polygon between selected primitives in accordance with some embodiments presented herein. 3D graphics system 100 receives (at 202) a set of points that are distributed in a 3D space of a point cloud representation of a 3D model. Each point is defined with positional data and visual characteristics and without normals.

3D graphics system 100 selects (at 204) a first point as first reference primitive 201 based on its positioning relative to the other points, and associates a normal to first reference primitive 201 based on its relative positioning. 3D graphics system 100 also selects (at 206) primitives 203-1 and 203-2 that neighbor first reference primitive 201 and that do not have a defined or adjusted normal based on a nearest neighbor search, proximity to first reference primitive 201, and/or other selection criteria.

3D graphics system 100 generates (at 208) the polygonal surface between first reference primitive 201 and neighboring primitives 203-1 and 203-2, and a normal that is perpendicular to the polygonal surface in the direction of the defined normal for first reference primitive 201. 3D graphics system 100 associates the generated (at 210) normal to each neighboring primitive 203-1 and 203-2.

3D graphics system 100 selects (at 212) second neighboring primitive 203-2 to become the second reference primitive, and primitives 205-1 and 205-2 that neighbor second reference primitive 203-2 and that do not have a defined or adjusted normal based on a nearest neighbor search, proximity to second reference primitive 203-2, and/or other selection criteria. 3D graphics system 100 generates (at 214) the polygonal surface between second reference primitive 203-2 and neighboring primitives 205-1 and 205-2, and the normal that is perpendicular to the polygonal surface in the direction of the defined normal for second reference primitive 203-2. 3D graphics system 100 associates the generated (at 216) normal to each neighboring primitive 205-1 and 205-2.

3D graphics system 100 continues selecting points or primitives with newly defined normals as the next reference primitive, selects points or primitives that neighbor the newly selected reference primitive and that do not have a defined normal, generates the polygonal surface between the newly selected reference primitive and selected neighboring points or primitives, and associates the normal that is perpendicular to the generated polygonal surface to each of the selected neighboring points or primitives. 3D graphics system 100 continues until all points or primitives are defined or associated with a normal.

Figure 3:
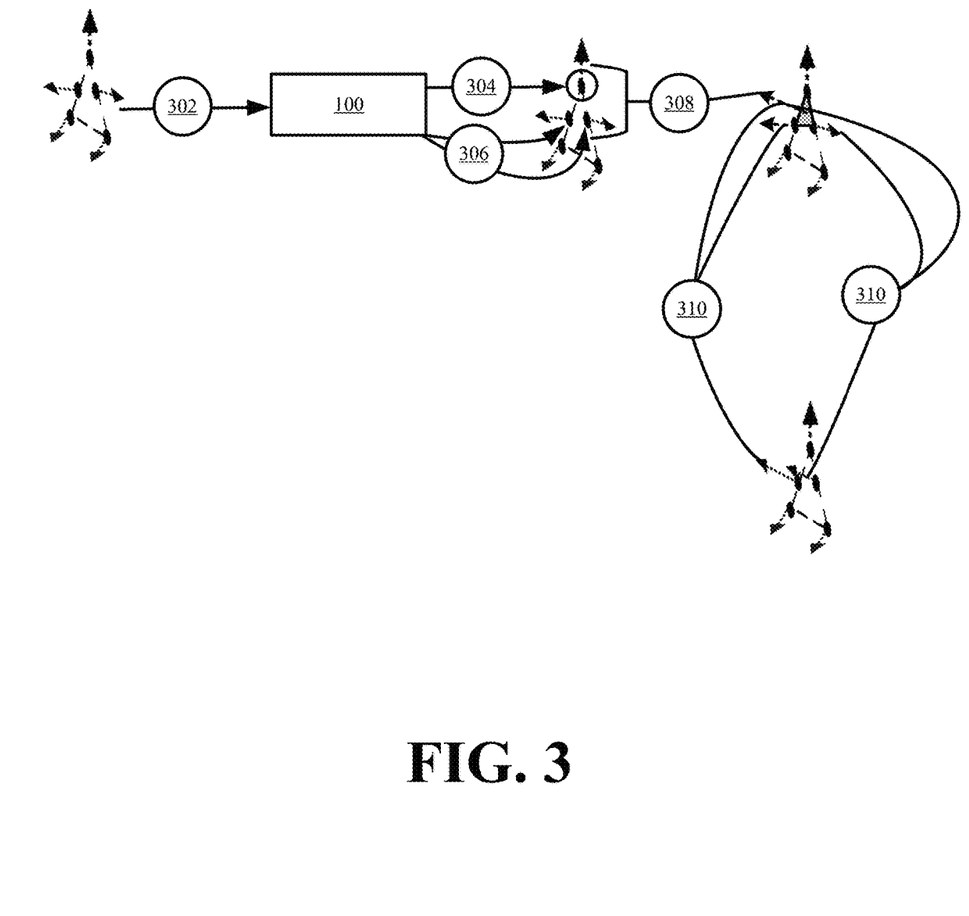
FIG. 3 illustrates an example of adjusting normals defined for primitives of a 3D model to improve the accuracy of the normals in accordance with some embodiments presented herein.

3D graphics system 100 may also be used to correct or adjust normals that were defined for the primitives of the 3D model using other less accurate techniques, thereby improving the accuracy of the normals. FIG. 3 illustrates an example of adjusting normals defined for primitives of a 3D model to improve the accuracy of the normals in accordance with some embodiments presented herein.

3D graphics system 100 receives (at 302) a 3D model with primitives that are defined with normals. An artist or other user may manually define the primitive normals. The manual normal definition may be very time-consuming and also highly inaccurate as the artist is estimating the angle or direction for thousands or millions of primitives. Alternatively, the primitive normals may be defined using other automated techniques. For instance, an artist or user may generate the complex form of the 3D model by manipulating basic or simple shapes with normals. Specifically, the user may start with a simple cube. Each side of the cube may be defined with a normal for the direction that the side faces. The user may transform, deform, or otherwise alter the shape of the cube by moving various vertices, deconstructing one side into many sides that are then independently moved, and/or applying other changes to the cube. The normals may be adjusted as the cube is changed. Certain changes may cause the normals to be incorrectly adjusted or aligned with the sides or modified primitives of the cube. The normals may also be created by a scanner that generates the positional data for the primitives. For instance, a Light Detection and Ranging (LiDAR) scanner may emit signals that reflect off different surfaces of a physical object, and may measure the position of the different surfaces based on the time-of-flight, angle-of-incidence, and/or other properties associated with the returning or reflected signals. The scanner may determine the normal direction based on the angle-of-incidence. However, the normal direction may be skewed by different materials of the physical object, by obstructions, by the positioning or orientation of the scanner, and/or other factors. Additionally, measurements for some parts of the physical object may be obstructed or otherwise interfered with resulting in no normal data or incorrect normal data being recorded for the primitives representing those parts of the physical object in the 3D model.

3D graphics system 100 adjusts the normals using the same operations that are used to define the normals for primitives that do not include normal data. 3D graphics system 100 scans the primitive positions to select (at 304) a reference primitive at a position that is commonly associated with a particular normal direction.

In some embodiments, 3D graphics system 100 adjusts the normal that is defined for the reference primitive if the pre-existing normal differs from the particular normal direction. In some other embodiments, 3D graphics system 100 retains the normal that is defined for the reference primitive even if the pre-existing normal differs from the particular normal direction.

3D graphics system 100 selects (at 306) the primitives that are the nearest neighbors or that are in proximity to the reference primitive. 3D graphics system 100 calculates (at 308) the normals for the nearest neighbors or proximate primitives based on an offset or difference in the position between the nearest neighbors or proximate primitives and the reference primitive or based on the angle of a surface that spans between the reference primitive and the nearest neighbors or proximate primitives. 3D graphics system 100 adjusts (at 310) the normals of the nearest neighbors or proximate primitives to match the calculated (at 308) normal for those primitives.

Figure 4:
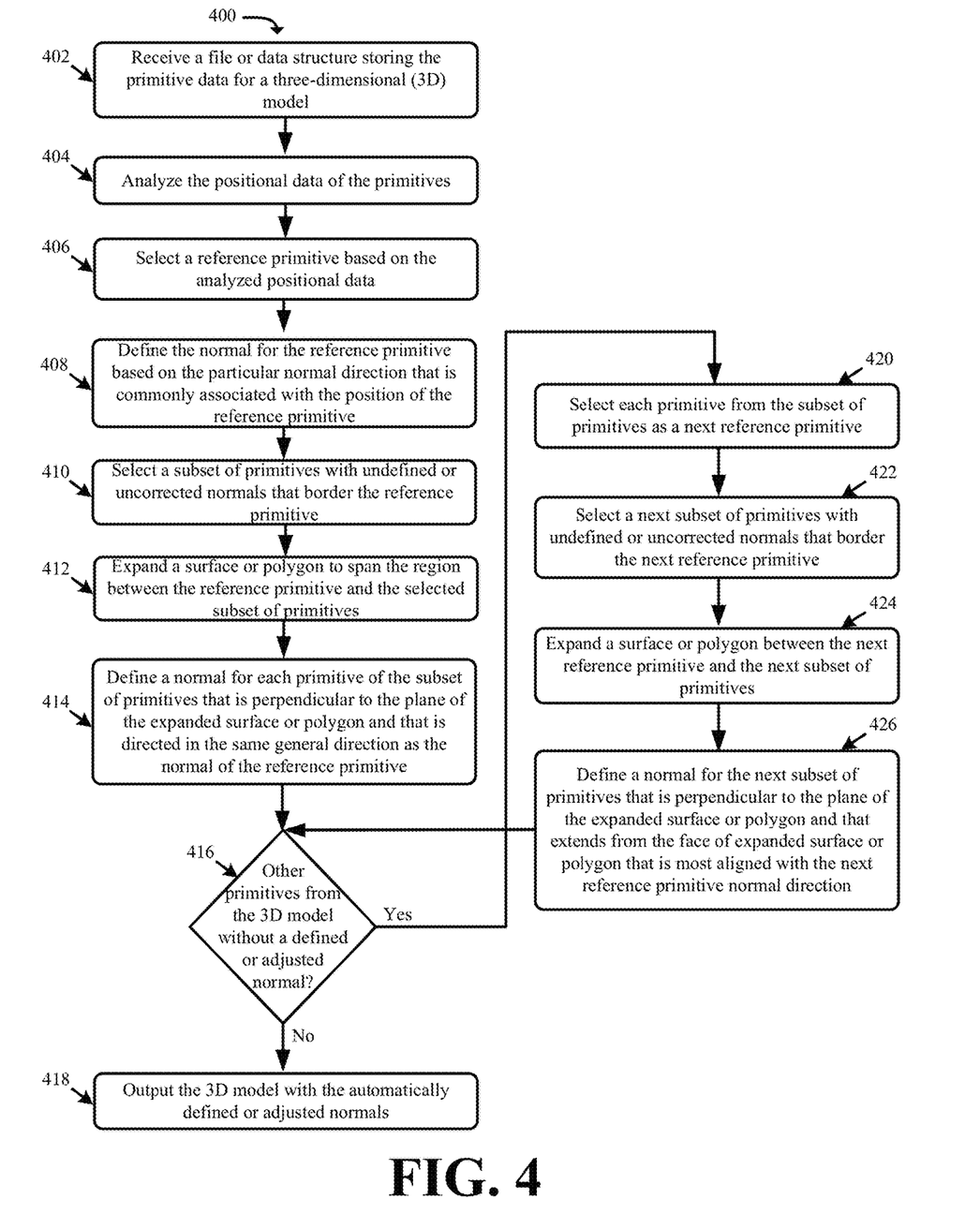
FIG. 4 presents a process for automatically defining or adjusting normals for primitives of a 3D model in accordance with some embodiments presented herein.

FIG. 4 presents a process 400 for automatically defining or adjusting normals for primitives of a 3D model in accordance with some embodiments presented herein. Process 400 is implemented by 3D graphics system 100. 3D graphics system 100 may include one or more devices or machines with processor, memory, storage, networking, and/or other hardware resources that are configured or adapted for 3D graphics processing. Accordingly, 3D graphics system 100 may include or use specialized hardware, such as a graphical processing unit (GPU), to optimize or perform the automatic normal definition or adjustment set forth in process 400.

Process 400 includes receiving (at 402) a file or data structure storing the primitive data for a 3D model. The primitive data may include positional data for the 3D positioning of the primitives, visual characteristics for the presentation of the primitives at their defined 3D positions, and, optionally, normal data that was previously defined and is subject to correction by 3D graphics system 100.

Process 400 includes analyzing (at 404) the positional data of the primitives. The analysis may include sorting the primitives based on their defined positions and/or searching the primitives for a primitive at a particular relative position in the 3D model.

Process 400 includes selecting (at 406) a reference primitive based on the analyzed (at 404) positional data. The analysis (at 404) may identify the primitive that is located at the particular relative position in the 3D model that is commonly associated with or that is associated with a high probability with a particular normal direction. Specifically, 3D graphics system 100 may search for the topmost primitive in the 3D model because the topmost primitive has a high probability (e.g., 90% or greater) of being associated with a directly upward facing or vertical normal, and the topmost primitive may be selected (at 406) as the reference primitive. Alternatively, 3D graphics system 100 may analyze (at 404) the positional data to identify the subset of primitives that are about a lowest plane and therefore represent the base or bottom of the 3D model, and may select (at 406) one primitive from the subset of primitives as the reference primitive based on the base or bottom of the 3D model being commonly associated with a normal that is vertically oriented downwards. As another example, the primitive with the closest z-coordinate or that is in the nearest plane may be associated with a normal direction that is directly facing forward.

Process 400 includes defining (at 408) the normal for the reference primitive based on the particular normal direction that is commonly associated with the position of the reference primitive. For instance, the topmost primitive of the 3D model selected (at 406) as the reference primitive is defined (at 408) with a vertical normal that is directed upward, and the bottommost primitive of the 3D model selected (at 406) as the reference primitive is defined (at 408) with a vertical normal that is directed downward.

Process 400 includes selecting (at 410) a subset of primitives with undefined or uncorrected normals that border the reference primitive. Selecting (at 410) the subset of primitives may include performing a nearest neighbor search for the primitives that surround or are closest to the position of the reference primitive. In some embodiments, 3D graphics system 100 sorts the primitives based on their position or distance from one another and selects (at 410) the subset of primitives to include two or more primitives that are next to the reference primitive in the sorted list.

Process 400 includes expanding (at 412) a surface or polygon to span the region between the reference primitive and the selected (at 410) subset of primitives. The vertices of the expanded (at 412) surface or polygon may be defined at the positions of the reference primitive and the selected (at 410) subset of primitives when the primitives correspond to discrete points or may be defined as the outermost vertex position of the reference primitive and the selected (at 410) subset or primitives when the primitives correspond to polygons that are each defined with multiple vertices.

The expanded (at 412) surface or polygon has a plane from which 3D graphics system 100 may calculate a normal direction. Accordingly, process 400 includes defining (at 414) a normal for each primitive of the subset of primitives that is perpendicular to the plane of the expanded (at 412) surface or polygon and that is directed in the same general direction as the normal of the reference primitive. In other words, the defined (at 414) normal extends from the face or side of the expanded (at 412) surface or polygon that is most aligned with the direction of the reference primitive normal.

Process 400 includes determining (at 416) if there are other primitives from the 3D model that do not have a defined normal or if there are other primitives that have not had their normals adjusted by process 400 or 3D graphics system 100. In some embodiments, 3D graphics system 100 tags the primitives that have an adjusted normal or scans the primitive definition to determine which primitives have a defined normal to assist in the determination (at 416).

Process 400 includes outputting (at 418) the 3D model with the automatically defined or adjusted normals in response to determining (at 416—No) that there are no primitives without a defined or adjusted normal. The 3D model may be stored for subsequent processing or may rendered to efficiently produce an accurate visualization of the 3D model.

Process 400 restarts in response to determining (at 416—Yes) that at least one primitive of the 3D model is without a defined or adjusted normal. Process 400 restarts by selecting (at 420) each primitive from the subset of primitives as a next reference primitive in response to determining (at 416—Yes) that at least one primitive of the 3D model is without a defined or adjusted normal, selecting (at 422) a next subset of primitives with undefined or uncorrected normals that border the next reference primitive, expanding (at 424) a surface or polygon between the next reference primitive and the next subset of primitives, and defining (at 426) a normal for the next subset of primitives that is perpendicular to the plane of the expanded (at 424) surface or polygon and that extends from the face of expanded (at 424) surface or polygon that is most aligned with the next reference primitive normal direction.

The accuracy of the automatically defined or adjusted normals may be affected in certain regions of a 3D model that have multiple edges and/or primitives facing different directions. For instance, the reference primitive may be located at an edge intersection and the neighboring primitives with undefined normals may be located on different facing sides or surfaces of the edge such that an expanded surface between the reference primitive and the neighboring primitives may result in the surface being misaligned with one or more of the sides or surfaces on which the neighboring primitives are located.

3D graphics system 100 may maintain the accuracy of the generated or adjusted normals by accounting for the positioning of the primitives that are selected as the nearest neighbors and by avoiding a selection of primitives that are positioned about two or more sides or surfaces of the 3D model in opposing directions. Specifically, 3D graphics system 100 may select the nearest neighbor primitives to include primitives that are positioned about a common surface, face, or side of the 3D model.

Figure 5:
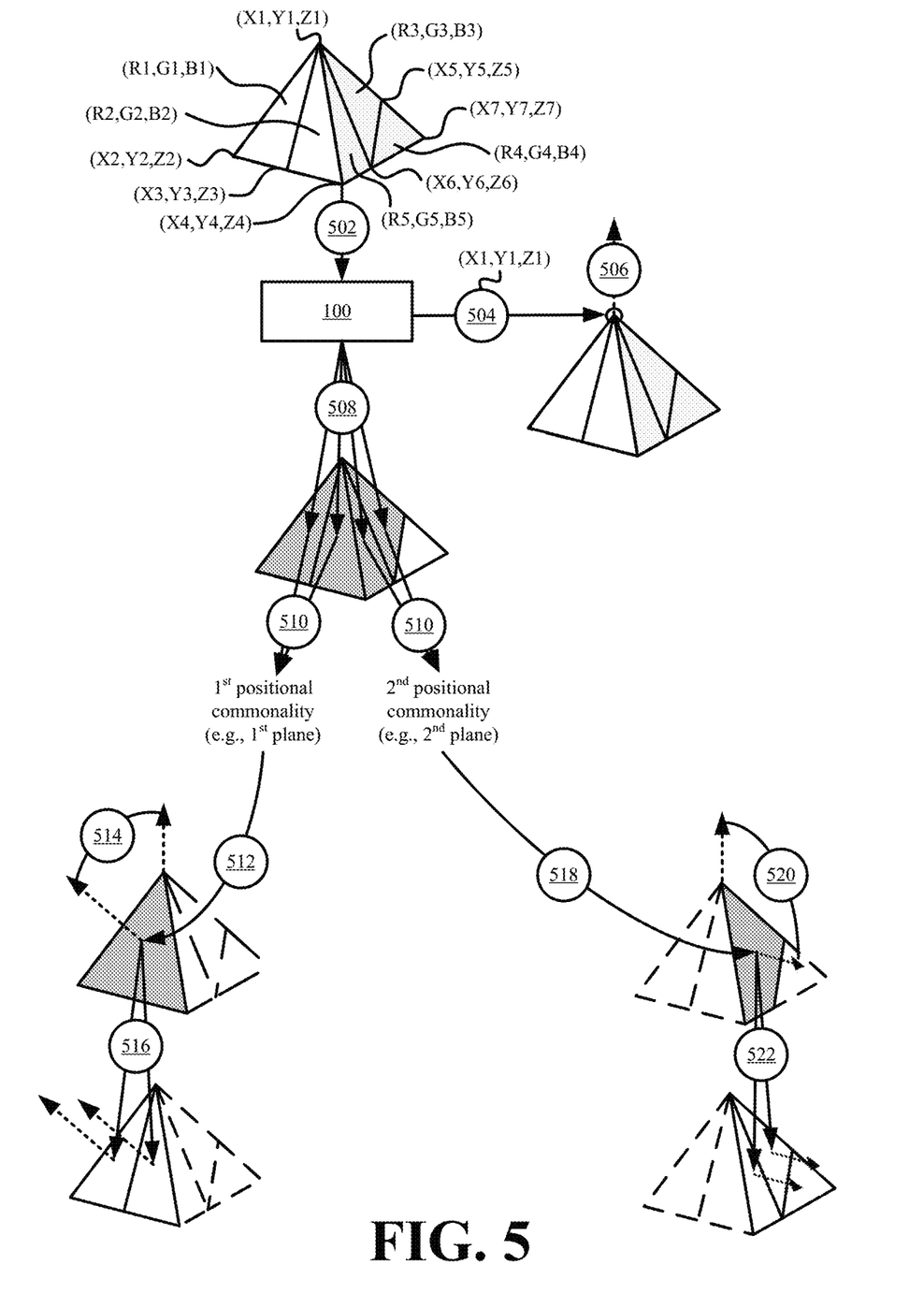
FIG. 5 illustrates an example of accurately defining normals by accounting for positional commonality amongst neighboring primitives in accordance with some embodiments presented herein.

FIG. 5 illustrates an example of accurately defining normals by accounting for positional commonality amongst neighboring primitives in accordance with some embodiments presented herein. 3D graphics system 100 receives (at 502) the positional data and the visual characteristics for the primitives of a 3D model.

3D graphics system 100 selects (at 504) a reference primitive. 3D graphics system 100 may select a particular primitive to be the reference primitive based on the relative positioning of the particular primitive in the complex 3D model and the relative positioning having a high probability of being associated with a particular normal direction. In this example, the primitives may correspond to meshes or polygons, and 3D graphics system 100 may select (at 504) a single vertex of a topmost polygon to be the reference primitive.

3D graphics system 100 defines (at 506) the normal for the reference primitive based on the particular normal direction that is associated with the relative position of the reference primitive in the complex 3D model. The particular normal direction may be based on the orientation of the 3D model, the positioning of the selected primitive in that orientation, and/or a classification of the 3D model using image or object recognition techniques before performing the reference primitive selection (at 504).

3D graphics system 100 selects (at 508) a first set of primitives that surround the reference primitive and that do not have a defined or adjusted normal. Once again, 3D graphics system 100 may select the first set of primitives to include two or more primitives that are positioned closest to the reference primitive. In this example, the first set of primitives may include primitives of the 3D model that have a shared vertex with the reference primitive.

3D graphics system 100 analyzes the positional data for each primitive of the first set of primitives for positional commonality. For instance, 3D graphics system 100 analyzes the positional data to determine which primitives from the first set of primitives are on a common plane or form of a common surface. The positional commonality may be verified or determined based on the visual characteristics of the primitives. For instance, primitives forming the same surface are likely to have similar or same colors, whereas primitives connected at edges and that represent different surfaces are likely to have color differentiation.

3D graphics system 100 partitions (at 510) the first set of primitives to a first subset of primitives that have a first positional commonality and a second subset of primitives that have a different second positional commonality. For instance, 3D graphics system 100 may determine from analyzing the positional data that the first subset of primitives form a first surface about a first side of the reference primitive and that the second subset of primitives form a second surface about an opposite second side of the reference primitive.

3D graphics system 100 generates (at 512) a first surface that spans the region between the reference primitive and the partitioned (at 510) first subset of primitives, and defines (at 514) a first normal that is perpendicular to the first surface and that is in a common direction as the normal of the reference primitive. 3D graphics system 100 assigns (at 516) the first normal to each primitive of the first subset of primitives.

3D graphics system 100 generates (at 518) a second surface that spans the region between the reference primitive and the partitioned (at 510) second subset of primitives, and defines (at 520) a second normal that is perpendicular to the second surface and that is in a common direction as the normal of the reference primitive. 3D graphics system 100 assigns (at 522) the second normal to each primitive of the second subset of primitives.

The 3D graphics system 100 defined or adjusted normals may be used to improve rendering performance or rendering accuracy. 3D graphics system 100 or an associated rendering engine may use the normals to perform occlusion detection or occlusion culling, wherein occlusion culling includes determining which primitives are visible and should be rendered and which primitives are not visible and should not be rendered. 3D graphics system 100 or an associated rendering engine may use the normals to accurately light the 3D model by realistically simulating the manner with which light reflects off individual primitives based on the directions of the normals defined for those primitives.

Figure 6:
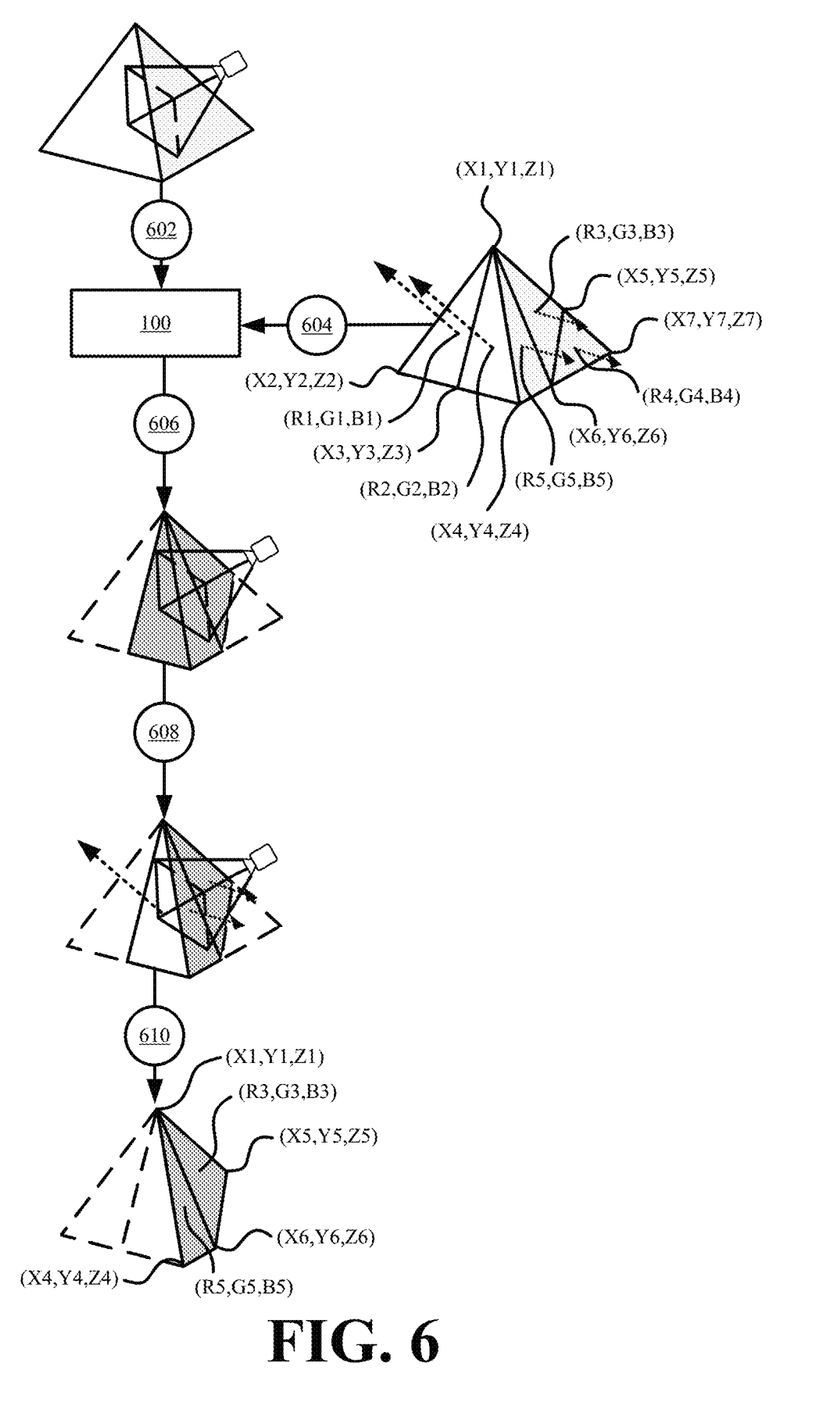
FIG. 6 illustrates an example of perform occlusion culling based on the automatically defined normals in accordance with some embodiments presented herein.

FIG. 6 illustrates an example of perform occlusion culling based on the automatically defined normals in accordance with some embodiments presented herein. 3D graphics system 100 receives (at 602) a request to render a 3D model from a specified render position. For instance, the request may specify a position and orientation for a virtual camera in the 3D space of the 3D model that determine a field-of-view or render frustum for the parts or primitives of the 3D model that become visible.

3D graphics system 100 retrieves (at 604) the positional data, visual characteristics, and normal data for the primitives of the requested 3D model. Based on the position data, 3D graphics system 100 determines (at 606) a first set of primitives that are positioned within the field-of-view or render frustum.

3D graphics system 100 compares the direction of the normals defined for each primitive of the first set of primitives to the field-of-view or render frustum, and determines (at 608) a first subset of primitives that are directed towards or facing the requested field-of-view, render frustum, or render position and are therefore visible, and a second subset of primitives that are directed away from the requested field-of-view, render frustum, or render position and are therefore occluded. 3D graphics system 100 renders (at 610) the positional data and visual characteristics for the second subset of primitives and may use the normals of the second subset of primitives to accurately light the generated visualization.

Figure 7:
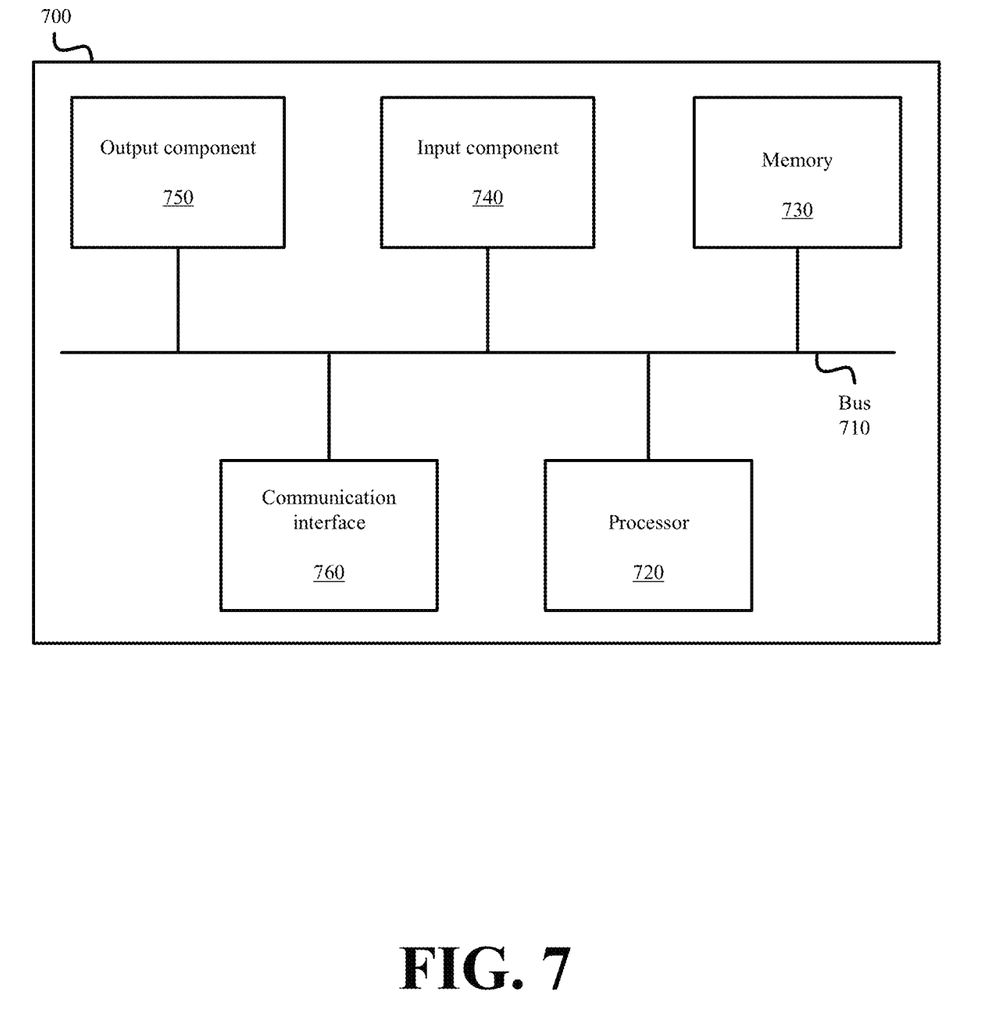
FIG. 7 illustrates example components of one or more devices, according to one or more embodiments described herein.

FIG. 7 is a diagram of example components of device 700. Device 700 may be used to implement one or more of the tools, devices, or systems described above (e.g., 3D graphics system 100, the rendering systems or engines, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device.

A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving a plurality of primitives that collectively form a three-dimensional (3D) model, wherein each primitive of the plurality of primitives corresponds to a mesh, polygon, or point;
   selecting a particular primitive from the plurality of primitives at a specific position relative to other primitives of the plurality of primitives;
   defining a first normal with a first direction for the particular primitive based on the specific position of the particular primitive relative to the other primitives being associated with the first direction;
   selecting a set of primitives from the plurality of primitives with positions next to the particular primitive, wherein the set of primitives comprises two or more primitives of the plurality of primitives;
   defining a second normal with a second direction that is perpendicular to a polygonal surface having vertices defined at the specific position of the particular primitive and two or more positions of the set of primitives; and
   defining each primitive of the set of primitives with the second normal that is perpendicular to the polygonal surface.

2. The method of claim 1, wherein selecting the particular primitive comprises:
   identifying a primitive from the plurality of primitives with a positional coordinate that is greater or less than the positional coordinate of other primitives in the plurality of primitives.

3. The method of claim 1, wherein defining each primitive with the second normal comprises:
   selecting the second direction to extend outward from a side of the polygonal surface that is most aligned with the first direction of the first normal defined for the particular primitive.

4. The method of claim 1 further comprising:
   selecting a first primitive from the set of primitives as a next reference primitive;
   selecting a second set of primitives from the plurality of primitives that have positions next to the first primitive and that are not defined with a normal; and
   defining a third normal for each primitive of the second set of primitives with a third direction that is perpendicular to a different surface spanned between positions of the first primitive and each primitive of the second set of primitives.

5. The method of claim 1 further comprising:
   expanding the polygonal surface between vertices or coordinates of the particular primitive and each primitive of the set of primitives; and
   determining the second direction that is perpendicular to a plane of the polygonal surface.

6. The method of claim 1 further comprising:
   updating a definition of each primitive of the plurality of primitives to include a position within a 3D space of the 3D model, visual characteristics to present at the position, and a normal that is defined for each primitive.

7. The method of claim 1 further comprising:
   outputting the 3D model with at least the second normal with the second direction for each primitive of the set of primitives.

8. The method of claim 1 further comprising:
   performing occlusion culling based on the second direction of the second normal defined for each primitive of the set of primitives being directed away from a position and orientation of a render position.

9. The method of claim 1 further comprising:
   defining a field-of-view based on a position and orientation of a virtual camera in a 3D space of the 3D model;
   determining that the set of primitives are positioned within the field-of-view;
   rendering the set of primitives in response to the second direction of the second normal being directed towards the position and orientation of the virtual camera; and
   generating a visualization of the field-of-view without rendering the set of primitives in response to the second direction of the second normal being directed away from the position and orientation of the virtual camera.

10. The method of claim 1 further comprising:
    determining that a specific relative position in the 3D model is commonly associated with a normal in the first direction;
    analyzing positioning of the plurality of primitives; and
    determining that the particular primitive is positioned at the specific relative position.

11. A three-dimensional (3D) graphics system comprising:
    one or more hardware processors configured to:
        receive a plurality of primitives that collectively form a 3D model, wherein each primitive of the plurality of primitives corresponds to a mesh, polygon, or point;
        select a particular primitive from the plurality of primitives at a specific position relative to other primitives of the plurality of primitives;
        define a first normal with a first direction for the particular primitive based on the specific position of the particular primitive relative to the other primitives being associated with the first direction;
        select a set of primitives from the plurality of primitives with positions next to the particular primitive, wherein the set of primitives comprises two or more primitives of the plurality of primitives;

define a second normal with a second direction that is perpendicular to a polygonal surface having vertices defined at the specific position of the particular primitive and two or more positions of the set of primitives; and define each primitive of the set of primitives with the second normal that is perpendicular to the polygonal surface.

12. The 3D graphics system of claim 11, wherein selecting the particular primitive comprises:

identifying a primitive from the plurality of primitives with a positional coordinate that is greater or less than the positional coordinate of other primitives in the plurality of primitives.

13. The 3D graphics system of claim 11, wherein defining each primitive with the second normal comprises:

selecting the second direction to extend outward from a side of the polygonal surface that is most aligned with the first direction of the first normal defined for the particular primitive.

14. The 3D graphics system of claim 11, wherein the one or more hardware processors are further configured to:

select a first primitive from the set of primitives as a next reference primitive;

select a second set of primitives from the plurality of primitives that have positions next to the first primitive and that are not defined with a normal; and define a third normal for each primitive of the second set of primitives with a third direction that is perpendicular to a different surface spanned between positions of the first primitive and each primitive of the second set of primitives.

15. The 3D graphics system of claim 11, wherein the one or more hardware processors are further configured to:

expand the polygonal surface between vertices or coordinates of the particular primitive and each primitive of the set of primitives; and determining the second direction that is perpendicular to a plane of the polygonal surface.

16. The 3D graphics system of claim 11, wherein the one or more hardware processors are further configured to:

update a definition of each primitive of the plurality of primitives to include a position within a 3D space of the 3D model, visual characteristics to present at the position, and a normal that is defined for each primitive.

17. The 3D graphics system of claim 11, wherein the one or more hardware processors are further configured to:

output the 3D model with at least the second normal with the second direction for each primitive of the set of primitives.

18. A non-transitory computer-readable medium storing instructions that, when executed by one or more processors of a three-dimensional (3D) graphics system, cause the 3D graphics system to perform operations comprising:

receiving a plurality of primitives that collectively form a 3D model, wherein each primitive of the plurality of primitives corresponds to a mesh, polygon, or point;

selecting a particular primitive from the plurality of primitives at a specific position relative to other primitives of the plurality of primitives;

defining a first normal with a first direction for the particular primitive based on the specific position of the particular primitive relative to the other primitives being associated with the first direction;

selecting a set of primitives from the plurality of primitives with positions next to the particular primitive, wherein the set of primitives comprises two or more primitives of the plurality of primitives;

defining a second normal with a second direction that is perpendicular to a polygonal surface having vertices defined at the specific position of the particular primitive and two or more positions of the set of primitives; and defining each primitive of the set of primitives with the second normal that is perpendicular to the polygonal surface.

* * * * *